United States Patent
Hassouneh et al.

(10) Patent No.: US 12,146,969 B1
(45) Date of Patent: Nov. 19, 2024

(54) NAVCUBE 2.0 MULTI-BAND SPACE RECEIVER

(71) Applicant: United States of America as represented by the Administrator of NASA, Washington, DC (US)

(72) Inventors: Munther Hassouneh, Greenbelt, MD (US); Luke Winternitz, Greenbelt, MD (US); Samuel R. Price, Greenbelt, MD (US); Luke J. Thomas, Greenbelt, MD (US); Yan Lu Chen, Greenbelt, MD (US); Jason Mitchell, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 284 days.

(21) Appl. No.: 17/038,358

(22) Filed: Sep. 30, 2020

(51) Int. Cl.
| | |
|---|---|
| G01S 19/32 | (2010.01) |
| G01S 19/37 | (2010.01) |
| G01S 19/39 | (2010.01) |
| G01S 19/45 | (2010.01) |
| G01S 19/46 | (2010.01) |

(52) U.S. Cl.
CPC .............. *G01S 19/32* (2013.01); *G01S 19/37* (2013.01); *G01S 19/393* (2019.08); *G01S 19/45* (2013.01); *G01S 19/46* (2013.01)

(58) Field of Classification Search
CPC ........ G01S 19/32; G01S 19/33; G01S 19/393; G01S 19/37; G01S 19/45; G01S 19/46; B64G 1/10–14; B64G 1/242; G01C 21/24
See application file for complete search history.

(56) References Cited

U.S. PATENT DOCUMENTS

| | | | | |
|---|---|---|---|---|
| 6,142,423 A | * | 11/2000 | Wehner ................. | B64G 1/369 244/164 |
| 6,211,822 B1 | * | 4/2001 | Dougherty ............. | G01S 19/28 342/357.36 |
| 6,266,584 B1 | * | 7/2001 | Hur-Diaz ............... | G01C 21/00 342/357.29 |
| 9,726,764 B1 | * | 8/2017 | Heinrich ............... | G01S 19/423 |
| 2008/0133135 A1 | * | 6/2008 | DiEsposti ............... | B64G 3/00 701/13 |

(Continued)

FOREIGN PATENT DOCUMENTS

| | | | | | |
|---|---|---|---|---|---|
| CN | | 108089431 A | * | 5/2018 | ............. G04R 20/04 |
| WO | WO-2008054482 A2 | * | 5/2008 | ........... B64G 1/1014 |

OTHER PUBLICATIONS

Winternitz, Luke B. et al. "Global Positioning System Navigation Above 76,000 km for NASA's Magnetospheric Multiscale Mission." Annual of Navigation 64 (2017): 289-300. (Year: 2017).*

*Primary Examiner* — Cassi J Galt
(74) *Attorney, Agent, or Firm* — Derek J. Langdon; Matthew F. Johnston; Trenton J. Roche

(57) ABSTRACT

A space based multi-band GPS/GNSS navigation system, including: RF card to receive and process the two different received navigation signals; a space grade navigation processor configured to: execute processor instructions to process the two different received navigation signals to produce position, velocity, and time information; and process measurements using a Kalman filter for enhanced performance at high altitude.

5 Claims, 2 Drawing Sheets

(56) References Cited

U.S. PATENT DOCUMENTS

| | | | |
|---|---|---|---|
| 2010/0297975 A1* | 11/2010 | Carrera | H04B 1/0085 |
| | | | 455/334 |
| 2011/0068979 A1* | 3/2011 | Waters | G01S 19/26 |
| | | | 342/357.65 |
| 2015/0247730 A1* | 9/2015 | Calmettes | G01S 19/05 |
| | | | 701/468 |
| 2017/0082755 A1* | 3/2017 | Thomas | G01S 19/37 |

* cited by examiner

NAVCUBE 2.0 MULTI-BAND SPACE RECEIVER

ORIGIN OF THE INVENTION

The invention described herein was made by employees of the United States Government, and may be manufactured and used by or for the Government for Government purposes without the payment of any royalties thereon or therefore.

TECHNICAL FIELD

Example embodiments disclosed herein relate generally to a multi-band frequency GPS receiver for space navigation, including high altitude and lunar applications.

BACKGROUND

The use of GPS/GNSS for space navigation in high altitude regimes beyond low-earth orbit (LEO) is more challenging due to degraded signal strength, availability, and geometry. Still, the cost and performance benefits of GNSS remain highly desirable for users in these regimes. NASA and its partners have a long and successful history of policy and receiver technology development efforts aimed at enabling high-altitude GNSS applications. Some notable missions now using GPS beyond LEO include the Geostationary Operational Environmental Satellite (GOES)-16 and 17 missions, and the record-setting Magnetospheric Multiscale (MMS) mission that has demonstrated excellent onboard GPS-based navigation in a highly elliptical orbit with a current apogee of 29 RE (~50% of the lunar distance). The MMS mission uses GPS receiver technology that is a predecessor to the presently described technology. These advances and operational demonstrations point to a new frontier for high-altitude GPS/GNSS in cis-lunar and lunar regimes, which the present technology specially targets.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a space based multi-band GPS/GNSS navigation system, including: RF card with two RF channels configured to receive and process the two different received navigation signals; a space grade navigation processor configured to: execute processor instructions to process the two different received navigation signals to produce position, velocity, and time information; and process measurements using a Kalman filter.

Various embodiments are described, wherein the antenna and the processing of the two different navigation signals provide enough gain so that the antenna receives sidelobes of the two different types of navigation signals.

Various embodiments are described, wherein the navigation system includes a suitable gain antenna and a clock to enable operation in the cis-lunar space and at and around the Moon.

Various embodiments are described, wherein navigation processor is configured to be reprogrammed after the navigation system is deployed in space.

Various embodiments are described, wherein the navigation processor is further configured to combine measurements from the two different navigation signals.

Various embodiments are described, wherein the Kalman filter is configured to process additional measurement types.

Various embodiments are described, wherein the additional measurement types include one of accelerometers, camera range/bearing, X-ray pulsar measurements, lidar measurements, and ground station dopplers/ranges.

Various embodiments are described, wherein navigation processor is further configured to produce position, velocity, and time information based upon the Kalman filter when navigation signals are received from fewer than four navigation satellites.

Various embodiments are described, wherein the navigation processor is configured to determine when a navigation signal degrades below a threshold level and to drop or ignore the channel for the satellite transmitting the degraded navigation signal.

Various embodiments are described, wherein the navigation processor is configured to use signal acquisition and tracking thresholds—as low as 25 dB-Hz.

Various embodiments are described, wherein the navigation processor is configured to have a time to first fix of less than about 300 seconds when cold and less than about 120 seconds when warm in a weak signal environment.

Various embodiments are described, further comprising an atomic clock connected to the navigation processor.

Various embodiments are described, further comprising a pulse per second system configured to produce a pulse per second signal based upon a least squares algorithm.

Various embodiments are described, wherein producing position, velocity, and time information further includes producing a pulse per second signal based on the output from the Kalman filter.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

To facilitate understanding, identical reference numerals have been used to designate elements having substantially the same or similar structure and/or substantially the same or similar function.

DETAILED DESCRIPTION

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Embodiments of a new high-altitude capable, reprogrammable, space Global Navigation Satellite System/Global Positioning System (GNSS/GPS) receiver platform is described herein. The new receiver firmware design evolved from a previous high altitude flight GPS receiver that was customized to run on a hardware platform with four highly utilized non-reprogrammable FPGAs, a standalone processor, and a GPS L1 C/A analog front-end. The previous firmware design was tightly coupled to the hardware and was not extensible nor reprogrammable. While GPS is used as an example navigation system/protocol, other navigation systems/protocols may also be used.

The new GPS receiver architecture described here derives from flight-proven Navigator GPS receiver technology and has the following capabilities: 1) is space qualified radiation tolerant design; 2) targets applications in all orbit regimes, including LEO, geostationary Earth orbit (GEO), and high Earth orbit (HEO) GPS navigation applications, including lunar space; 3) allows for easy reprogramming of firmware and software on-orbit, and 4) is dual frequency capable of receiving GPS L1 and GPS L2C signals and is expandable to receive other modern civilian GPS signals, e.g., GPS L5, L1C.

Figure 1:
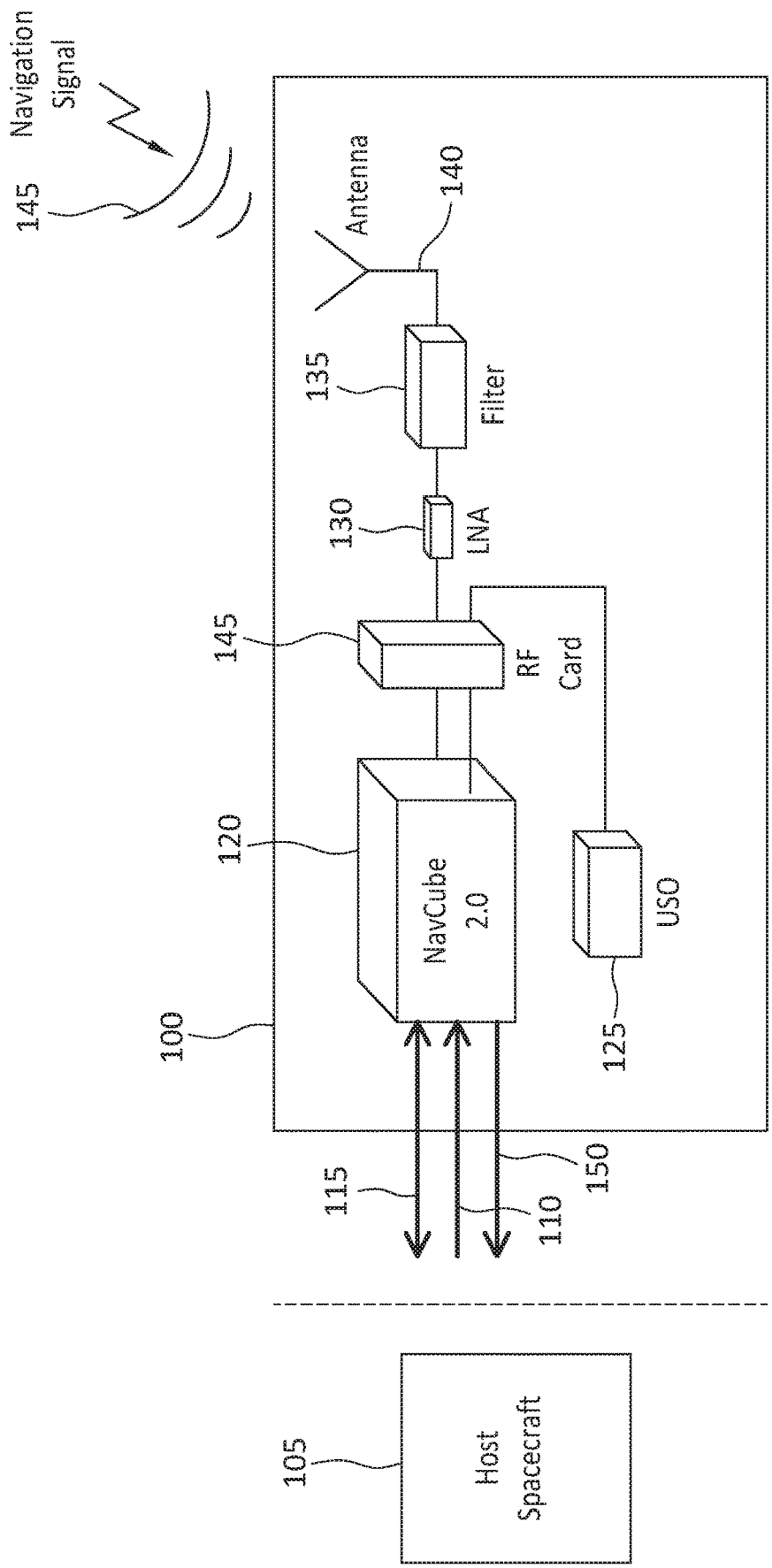
FIG. 1 illustrates a navigation system for HEO and lunar applications.

FIG. 1 illustrates a navigation system for HEO and lunar applications. The navigation system 100 includes an antenna 140, a filter 135, an low noise amplifier (LNA) 130, an RF card 145, a navigation processor 120, a reference oscillator (RO) 125. The navigation system 100 is hosted on and interacts with a host spacecraft 105. The navigation system is a high-altitude dual frequency GPS receiver with a powerful weak-signal acquisition engine that allows it to acquire and track sidelobe signals (as low as 25 dB-Hz) with no a-priori knowledge. The navigation system 100 may track two different navigation signals, e.g., the GPS L1 (C/A) and GPS L2C signals, but other signals may be tracked instead. The use of these two different frequency bands include the following benefits: the ability to sense and/or reduce ionospheric delays: greater reliability and accuracy; the L2C signal has a modernized message with additional information such as Earth orientation parameters and allows for autonomous operations with less ground updates; and the L2C signal has a pilot channel that may allow for enhanced tracking.

The navigation processor 120 may run the Goddard Enhanced Onboard Navigation System (GEONS) Extended Kalman Filter (EKF) flight software. The navigation processor 120 may produce a point, velocity, and time (PVT) solution. Further, the navigation processor 120 may be a NASA SpaceCube 2.0 processor. The navigation receiver 100 supports fast-acquisition for rapid recovery after re-entry radio blackout. For example the time to first fix may be for a strong signal environment: less than about 40 seconds cold (dominated by the ephemeris decode); less than about 6 seconds warm (dominated by subframe synchronization); and less than 1 second reacquisition (zero a-priori time to just reacquire code phase, Doppler in acquisition search). For example, the time to first fix may be for a weak signal environment may be less than about 300 seconds cold and less than about 120 seconds warm.

The RO 125 may be an ultra-stable crystal oscillator. In other embodiments that require increased accuracy, the RO 125 may be implemented using a space atomic clock. Atomic clocks are commercially-available products with a rich heritage that includes numerous units flying on various missions.

The antenna 140 receives a navigation signal 145, which in this example is a GPS signal, but could be other types of navigation signals. A filter 135 filters the received signal so that only frequency bands of interest are received. The filter 135 may be a cavity bandpass filer tuned to pass the navigation signal frequencies of interest. The LNA 130 amplifies the filtered signal. The RF card 145 receives the signal from the LNA 130 and produces a digital output representing the input signal to the navigation processor 120. The RF card 145 supports two RF chains for GPS L1 and L2 frequencies. Additional RF chains may be included if other types of navigation signals are to be processed as well. It also supports an onboard reference clock such as the RO 125 or an external reference clock for more frequency stability demanding applications, e.g., high altitude, cislunar (defined here to be the space between GEO and lunar space) and lunar applications. The RF card 145 is attached to the navigation processor 120 platform running specialized GPS firmware and software capable of receiving the GPS L1 C/A and L2C signals. The RF front-end card 145 applies the appropriate gain, downconverts the GPS RF signal to an IF signal, and digitizes the IF signal with an onboard analog to digital converter (ADC). The ADC samples are then sent to the navigation processor 120 which uses the data to produces a GPS navigation solution.

The antenna 145 may include an Earth-pointed high-gain GPS antenna sized appropriately to provide adequate gain. The antenna 145 may be a multi-band GPS/GNSS antenna. The antenna is selected to provide adequate gain to compensate for the Radio Frequency (RF) free space losses resulting from a lunar orbit. This gain may be achieved with a small diameter dish or multi-element array mounted on an Earth-pointed gimbal. The antenna needs a field of view that is wide enough to encompass the current GPS constellation, which only subtends about 8° at lunar distances. In other embodiments the antenna field of view may be greater than 8°.

The previous NASA high altitude flight GPS system used four different FPGAs that are pre-programmed to carry out acquisition, FFT, track, and communication and it was a single frequency system capable of tracking GPS L1 C/A signal only. It was not reprogrammable and therefore did not allow for on-orbit firmware or software updates. The navigation processor 120 is a processor that implements each of these functions on a single radiation tolerant, reprogrammable FPGA chip. The reprogrammable FPGA chip may be a Virtex 5QV SIRF FPGA allowing for on-orbit firmware updates. Further, other navigation and processing functions may also be implemented on a FPGA internal soft processor such as a MicroBlaze soft processor. Because the navigation processor 120 software program memory is programmable, the software implementing the navigation functions using navigation signals may be updated during flight.

Figure 2:
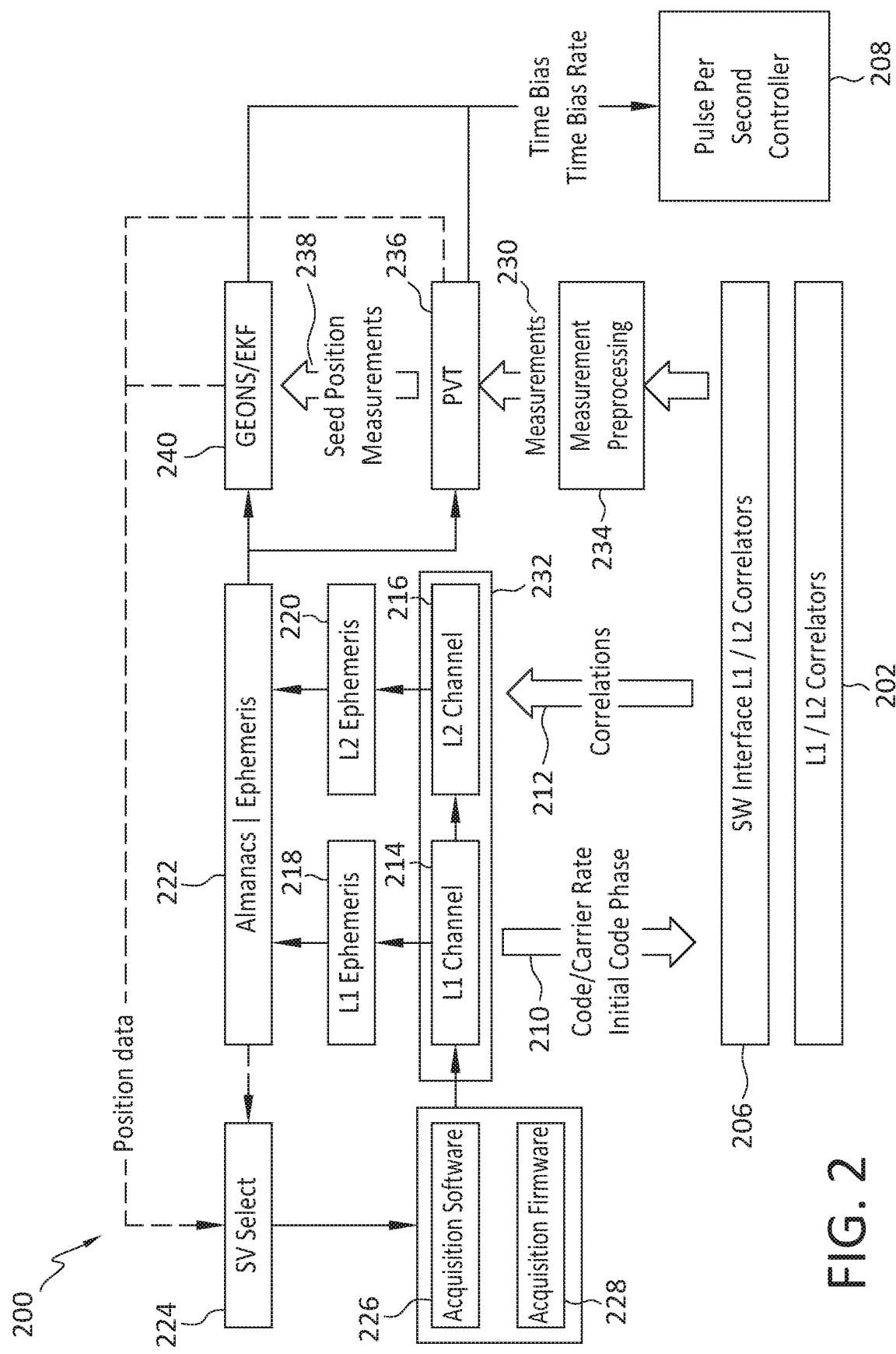
FIG. 2 illustrates a flow diagram of the different threaded tasks of the navigation processing.

FIG. 2 illustrates a flow diagram of the different threaded tasks of the navigation processing. Upon startup, the space vehicle (SV) select task 224 begins by commanding the acquisition task 226 where various GPS satellites to be acquired. Acquisition processes uses firmware 228 or software 228 to implement this function. Successful acquisitions are used to start L1 tracking channels 214, i.e., tracking the L1 signals transmitted by the acquired GPS satellites. Unsuccessful acquisitions may be determined by low correlation strengths. The SV task 224 also monitors and determines if a GPS satellite is already being tracked by monitoring the current tracking channels 214. The L1 GPS tracking channels 214 are used to start L2 tracking channels 216.

For the L1 channels, the channels may be run at 1, 2, 4, 5, 10, or 20 millisecond correlator update rates. Fast Fourier transforms (FFTs) are used for carrier pull-ins to estimate the carrier frequency and to start a phase-locked loop. The L1 channel may be used to seed the L2 channel using the doppler/code phase information from the current L1 tracking information.

For the L2 channels, medium/long correlations may be kept separate until used in correlator update. The medium code data bits may be decoded using a lookup table, or a Viterbi decoder. Also, the medium/long correlations are combined at the correlation update rate. Ambiguity of medium correlation due to data bits may be resolved by comparing the medium/long prompt correlations prior to combining.

The Ephemeris task 222 receives raw transmitted data from L1/L2 channels 218, 220 and decodes and stores the data. The Ephemeris task also serves a role in fault detection by monitoring and flagging errors in decoded ephemerides. This is done via the following checks: strong signals are determined to be valid, and decoded ephemerides are compared against previously validated ephemerides; decoded L1 ephemerides are compared against L2 ephemerides; decoded L1 ephemerides are compared against almanac data; ephemerides are checked for validity of transmitted data; and ephemeris tasks manages ephemeris requests and returns the most precise valid data for requested time in a standardized format where the data includes L2 Ephemeris, L1 ephemeris, L2 Almanac, and L1 Almanac.

Correlators 202 receive the various GPS signals and correlate the signals using specific codes associated with codes unique to each GPS satellite in order to determine a time of arrival. The software interface 206 provide the data from the correlators via channel interface 232 to the L1 channel 214, and the L2 channel 216, and measurements 230 to the Position, Velocity, Time (PVT) task 236. Measurements may be combined from L1/L2 channels to enhance the receiver performance. The tracking channels 214, 216 may be monitored to determine if measurements are from channels with decaying signal strength. When channels decay below a threshold level those channels may be dropped. Measurements 230 may be filtered/averaged/smoothed prior to providing the measurements to the PVT task 236 and the GEONS task 236 by using optional measurement preprocessing 234. The PVT task 236 receives measurements and calculates position, velocity, time, time bias, time bias rate using least squares algorithm. High residual measurements may be removed from the solution, and PVT may be recalculated after removal of measurements if needed. Other performance metrics may be used to validate/invalidate the solution. Validation checks may be performed on doppler/velocity residuals. The PVT output may be sent to the SV select task. The PVT output may also be used to seed position measurements 238 in the GEONS/EKF task 240.

GEONS is a navigation software package using a Kalman filter that supports enhanced navigation especially critical for high-altitude applications, and GEONS outputs may be used to enhance the performance of the receiver basic functions. The GEONS/EKF task 240 is started with an initial position and measurement data. The GEONS/EKF task 240 propagates position, velocity, time solutions, and corrects state/velocity with measurements data. The GEONS task 240 calculates covariance information related to estimated state error. The GEONS task 240 is able to provide position/velocity/time information when less than four satellites are tracked. When state information from the PVT task 240 is available a comparison state is produced for validation of the GEONS/PVT state. An initial state may be uploaded from the ground that may be provided to the GEONS/EKF task 240 in situations where a point solution may not be possible (e.g., the number of GPS tracked satellites <4).

In addition to processing GPS measurements, GEONS 240 may process accelerations from an external source during maneuvers and may process external measurement sources to improve navigation and timing performance. Additional external measurements may include, but are not limited to, accelerometers, camera range/bearing, X-ray pulsar measurements, lidar measurements, ground station dopplers/ranges etc.

The SV select task 224 is provided with position/time information from either the PVT 236 or GEONS/EKF 240, and GPS almanac data from Ephemeris task 222. This information may be used to reduce the doppler search space for weak acquisitions.

The SV select task 224 may determine the GPS acquisition selection order. This may include the following steps: receiving Position data from PVT/GEONS; requesting time from firmware/software; requesting ephemeris data from ephemeris task; and then determining if SV is currently tracked. Then for weak acquisitions, when available, the doppler search space is reduced by predicting a GPS satellites received doppler frequency by using position/time data from GEONS/PVT in conjunction with ephemeris/Alamac data from the ephemeris task. The SV select task then sends acquisition commands to the acquisition task 226.

Time solutions from PVT 236 or GEONS/EKF 240 are provided to the Pulse Per Second task 208. The Pulse Per Second task 209 produces the receiver's one Pulse Per Second (1PPS) output.

Embedded applications may be dependent upon processor hardware firmware to handle CPU intensive tasks including but not limited to correlations, and acquisition, but the algorithms implemented in firmware may also be implemented in software. The navigation system may be run either with or without firmware.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A space based multi-GNSS navigation system located on a host spacecraft, comprising:
 a multi-band antenna;
 an RF card with two RF chains connected to said multi-band gain antenna and configured to receive and process both a GPS L1 navigation signal and a GPS L2C navigation signal;
 a space grade processor, communicably connected to the host spacecraft, configured to execute processor instructions to:
  pre-process both the GPS L1 navigation signal and the GPS L2C navigation signal, wherein the pre-processing includes receiving GPS L1 signal measurements and GPS L2C signal measurements, combining the GPS L1 signal measurements and GPS L2C signal measurements, and at least one of filtering, averaging, and smoothing of the combined GPS L1 and GPS L2C signal measurements, wherein the measurements are based on code phase information;
  calculate a first position, velocity, and time information based on the combined pre-processed GPS L1 and GPS L2C measurements;
  calculate a second position, velocity, and time information using a Kalman filter based on at least one of the first position, velocity, and time information and a third position, velocity, and time information received from a ground station via the host spacecraft, wherein the third position, velocity, and time information is used when both the GPS L1 and GPS L2C navigation signals are received from fewer than four satellites; and
  select a GNSS satellite to acquire and track based on at least one of the first position, velocity, and time information and the second position, velocity, and time information,
 wherein the space grade processor is configured to reduce a doppler search space based on at least one of the first position, velocity, and time information and the second position, velocity, and time information and ephemeris data processed from the GPS L1 and GPS L2C navigation signals.

2. The system according to claim 1, wherein the space grade processor is configured to predict a received doppler frequency from the GNSS satellite.

3. The system according to claim 1, wherein the first position, velocity, and time information is recalculated if the pre-processing step provides high residual measurements, wherein the recalculating removes the high residual measurements.

4. The system according to claim 1, wherein the step of selecting the GNSS satellite is further based on the ephemeris data.

5. The system according to claim 1, wherein the second position, velocity, and time information is further calculated based on external measurements received from the host spacecraft, wherein the external measurements is at least one X-ray pulsar measurements, LiDAR measurements, accelerometers, and camera measurements.

* * * * *